Oct. 31, 1944.  F. MASOWICH  2,361,861
SYPHON FOR THE REMOVAL OF WELDING FUMES
Filed Feb. 9, 1944

INVENTOR.
FRANK MASOWICH
BY Richey & Watts.
ATTORNEYS

Patented Oct. 31, 1944

2,361,861

UNITED STATES PATENT OFFICE 2,361,861

SIPHON FOR THE REMOVAL OF WELDING FUMES

Frank Masowich, Lorain, Ohio

Application February 9, 1944, Serial No. 521,703

3 Claims. (Cl. 230—95)

This invention relates to siphons, especially to portable air siphons or suction devices.

In industrial production work, many fabrication or production steps occasion the generation of objectionable or toxic gases which must be removed from the generating area in order to maintain efficient production. Such gases may be removed by ventilating systems of various types nearly all of which involve large, permanently positioned conduits, fans and/or suction creating apparatus. None of such systems have been adapted for use in drawing off gases from an ambient source, especially one which is temporarily positioned in a confined space. One example of such a problem is the disposal of gases generated by a flame or arc welder working in a ship's hold, or within a tank. Welders working under such conditions have been exposed to toxic gases to the extent that high rates of illness and absenteeism are occasioned thereby.

It is the general object of this invention to provide suitable apparatus to overcome and eliminate the toxic gases or other objectionable fumes produced by an ambient generator temporarily positioned in a confined space.

Another object of the invention is to provide a portable air siphon.

Further objects of the invention are to provide a novel, sturdy, easily constructed air siphon which is inexpensive to operate; and to provide a lightweight air siphon that is readily and easily moved to maintain proximity to a mobile fume producer.

The aforesaid objects of the invention, and other objects which will become apparent as the description proceeds, are achieved by providing a mobile double funnel having a single discharge tube, which funnel has a flexible connection to an energy source used in generating suction in one portion of the double funnel in order to draw toxic gas into the double funnel and dispose of it through the discharge tube at a point remote from the receiving mouth of the funnel.

For a better understanding of the invention reference should be had to the accompanying drawing, in which.

Figure 1:
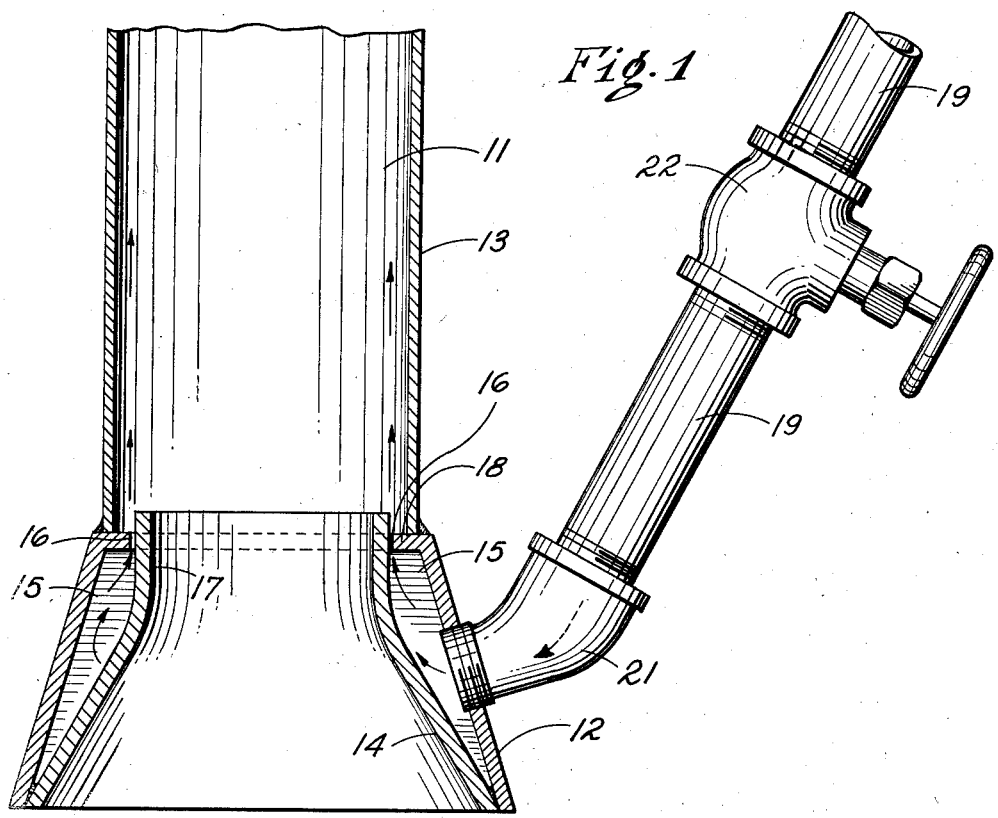
Fig. 1 is a section on line A—A of the apparatus shown in Fig. 2.
Figure 2:
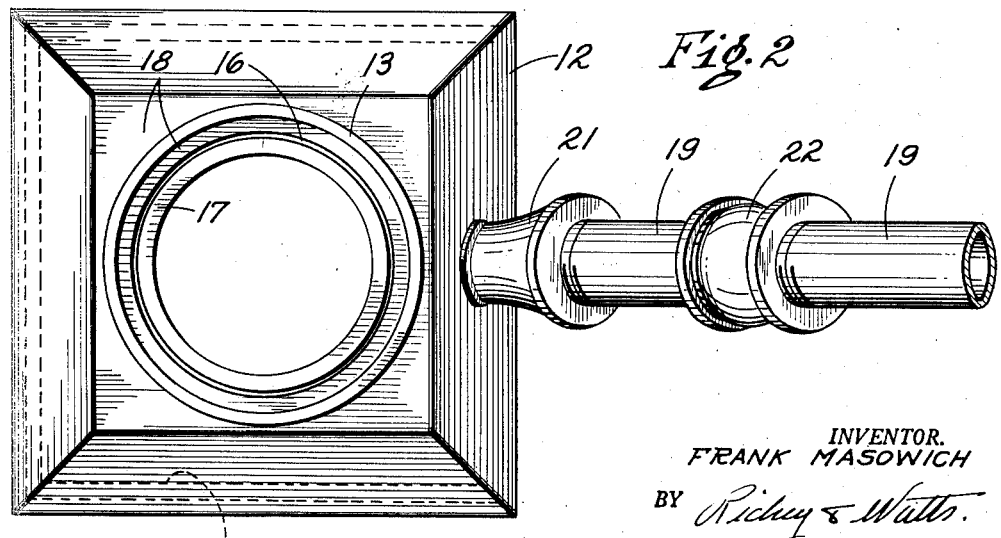
Fig. 2 is a plan of one embodiment of an air siphon of the invention.

With specific reference to the form of the invention illustrated in the drawing, the numeral 11 indicates, in general, a mobile air siphon that includes a funnel 12. The funnel 12 normally is made from sheet metal to contribute to the mobility of the air siphon 11, which includes a discharge pipe 13 connected to the discharge end of the funnel 12. Such discharge pipe 13 serves as an exhaust for gases passing through the air siphon 11 and, it will be seen, may be made of any desired length dependent upon what disposition is required of the gases being exhausted. For gases from flame welding or arc welding on galvanized plates within a confined space, it only is necessary to use a discharge pipe three or four feet long which in the absence of violent drafts has been found sufficient to safeguard the welder or remove the hazard of his inhaling the fumes in concentrated form. The discharge pipe 13 may have an elbow (not shown) at its end so that vented gases may be directed in any desired direction. When desired, the discharge pipe 13 may be flexible and may vent at any distance from the gas origin point, but normally the mobility of the air siphon 11 is best served by a short discharge pipe fixedly secured thereto.

A secondary funnel 14 is received in the funnel 12 and sealed to the receiving mouth, or input end thereof so that the secondary funnel serves as the conduit for gases to be siphoned by the apparatus of the invention. The secondary funnel 14 has greater taper than the funnel 12 to form a chamber 15 therebetween. Gas in the chamber 15 can only exhaust through a restricted tubular opening 16 between a cylindrical neck 17 formed on the secondary funnel 14 and a throat 18 formed at the discharge end of the funnel 12. The restricted tubular opening 16 is immediately adjacent, and above, or before, the discharge end of the neck 17 so that venting of gas at sufficient velocity through such opening will create a partial vacuum in the secondary funnel 14 and drawing the gases into the receiving mouth of the air siphon 11 from the space thereadjacent.

In order to provide energy for use in operating the air siphon 11, a tubular line 19 is connected to the chamber 15 by a coupling 21 having a control valve 22 therein. Ordinarily, the line 19 should be flexible to enable the air siphon 11 to be moved as desired and the line 19 should be connected to a suitable source of compressed air or other compressed gas to be used in the operation of the air siphon 11. Compressed gas from the line 19 can flow into the chamber 15 and build up pressure therein. Proper correlation of the compression and volume of the gas fed into the chamber 15 will effect the desired rate of discharge of gas through the opening 16. This, as pointed out hereinbefore, creates a suction in the secondary funnel 14 to draw gases into and through the discharge pipe 13 at a point remote from the receiving mouth of the air siphon 11.

It will be readily recognized that the gases drawn into the funnel will be commingled with the air delivered through the line 19 and thus substantially diluted while passing through the siphon. It will also be apparent that the velocity of the gas and air discharged from the pipe 13 will maintain the fluid in an unbroken stream or column for an appreciable distance beyond the end of the pipe and thus eliminate the need of sectional extensions or the use of a conduit of cumbersome proportions.

It has been found that even a relatively small diameter for the receiving mouth of the secondary funnel 14, such as approximately six inches, with compressed air supplied at 100 pounds per square inch in a ¾" line 19 has functioned effectively when used with a $\frac{1}{32}$" opening circumambient a 4" diameter discharge pipe. Af course, the air siphon 11 should be placed in close proximity and preferably superjacent the fume creating medium in order to facilitate the most effective removal of fumes by the siphon.

While the outer member of the siphon 11 has been shown as frustro conical in shape, it will be observed that such configuration is not essential and that the outer jacket for the secondary funnel 14 may be of other suitable form. It will be noted, moreover, that the outer jacket need not extend the length of the inner funnel (the secondary funnel 14) as long as it encompasses the inner funnel adjacent the discharge end thereof.

Although no supports are shown for the air siphon 11, legs or a sling associated with a stanchion may be provided therefor to facilitate the mountings thereof. The air siphon 11, as shown, may be blocked into operative position rested on its side, or suspended over the work by a rope, wire or similar medium.

The air siphon 11 is preferably made from sheet metal sections welded together to form a sturdy, lightweight construction. It will be seen that the objects of the invention have been achieved by provision of the mobile air siphon described herein.

While in accordance with the patent statutes one best known embodiment of the invention has been illustrated and described in detail, it is to be particularly understood that the invention is not limited thereto or thereby, but that inventive scope is defined in the appended claims.

What is claimed is:

1. A portable air siphon comprising an outer funnel, a secondary funnel therein sealed thereto at the receiving mouths of said outer funnel and said secondary funnel, said secondary funnel having a greater taper than said outer funnel to form a chamber therebetween, said outer funnel having a discharge throat immediately adjacent but spaced radially from said secondary funnel immediately above the discharge end thereof to form a restricted discharge opening for said chamber, a discharge tube connected to said outer funnel immediately above the discharge throat thereof, flexible conduit for feeding compressed air to said chamber and a valve associated therewith and disposed adjacent said outer funnel to control the rate of discharge of the gas in the vicinity of the air siphon and the dilution of the gas discharged therefrom.

2. A lightweight, portable air siphon comprising a sheet metal outer funnel, a secondary sheet metal funnel therein sealed thereto at the receiving mouth of said outer funnel, said secondary funnel having a greater taper than said outer funnel and defining a chamber therebetween, said outer funnel having a discharge throat spaced from said secondary funnel immediately below the discharge end thereof and forming a restricted discharge opening for said chamber, a discharge tube connected to said funnel immediately above the discharge throat thereof and extending at least several feet away from said funnel, a flexible conduit for supplying air under pressure to said chamber and a valve in said conduit contiguous said outer funnel for the control of the flow of air into said chamber and the discharge rate of the siphon.

3. A portable air siphon comprising a double walled sheet metal funnel, the walls of which are sealed together at the receiving mouths thereof, the wall of the inner funnel having a greater taper than the wall of the outer funnel and defining a chamber therebetween, a discharge tube connected to the wall of said outer funnel above the discharge end thereof, the wall of the outer funnel being constructed and arranged to form a restricted tubular discharge opening for said chamber immediately below the discharge opening for the wall of the inner funnel, a pipe in said outer funnel for conducting gas under pressure into said chamber to create suction in said double walled funnel and a valve in said pipe contiguous the outer funnel for the control of the flow of gas into said chamber.

FRANK MASOWICH.